United States Patent

[11] 3,588,771

[72] Inventor David F. Martin
Princeton, N.J.

[21] Appl. No. 708,740
[22] Filed Dec. 14, 1967
Division of Ser. No. 495,042, Oct. 12, 1965
[45] Patented June 28, 1971
[73] Assignee RCA Corporation

[54] METHOD AND APPARATUS FOR MANUFACTURING MAGNETIC RECORDING TAPE
4 Claims, 6 Drawing Figs.

[52] U.S. Cl. .......... 335/284, 179/100.2
[51] Int. Cl. .......... H01f 13/00
[50] Field of Search .......... 335/284; 179/100.2 (T)

[56] References Cited

UNITED STATES PATENTS 2,921990 1/1960 Ginsburg et al .......... 179/100.2(T)UX
3,229,035 1/1966 Bounsall .......... 179/100.2(T)UX
3,354,416 11/1967 Vereycken et al. .......... 335/284

FOREIGN PATENTS 902,838 8/1962 Great Britain .......... 335/284

*Primary Examiner*—G. Harris
*Attorney*—Glenn H. Bruestle

ABSTRACT: A method of manufacturing magnetic recording tape having at least two tracks which are transversely oriented with respect to each other comprises coating a tape web and then passing the wet coating through a special magnet having a pair of opposed zigzag gaps which produces a magnetic field having longitudinally directed and transversely directed portions. The coating is then solidified and the web slit into tapes. The magnet for orienting the magnetic particles comprises a core having a longitudinal axis and two spaced confronting portions on each side of the axis. Each of the portions have two pieces and are spaced to provide a gap of a predetermined distance. The gaps describe zigzag courses in the transverse direction to the axis and the gaps are opposed to one another. The apparatus includes means for inducing magnetic flux in each of the confronting portions.

Figure 1:
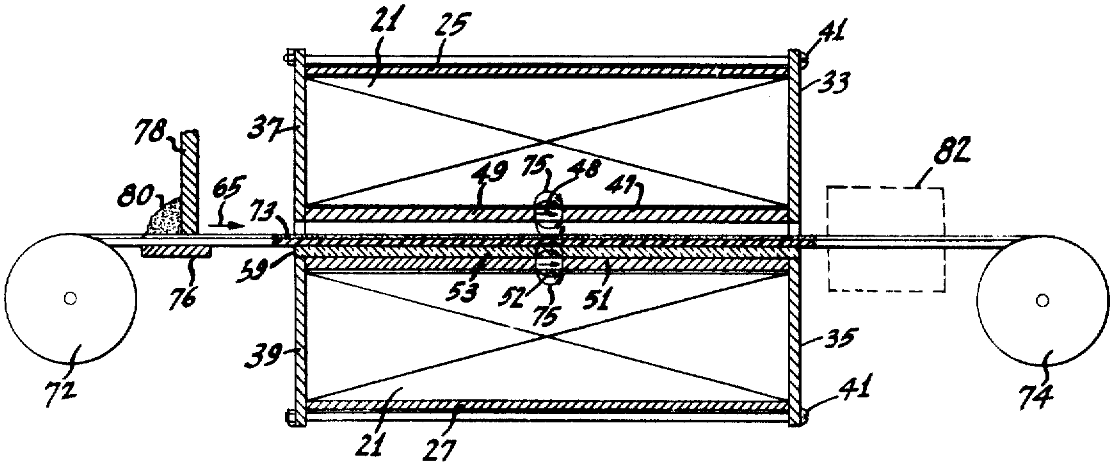

INVENTOR.
DAVID F. MARTIN
BY
L. Greenspan
Attorney

INVENTOR.
DAVID F. MARTIN
BY L. Greenspan
Attorney

METHOD AND APPARATUS FOR MANUFACTURING MAGNETIC RECORDING TAPE

This application is a division of U.S. Application, Ser. No. 495,042, filed Oct. 12, 1965.

In the manufacture of magnetic recording tape, a liquid mixture of magnetic particles and a binder therefor is coated on a backing and then dried thereon. In order to improve the performance characteristics of the product, the particles are oriented, so that the dry coating exhibits a greater residual induction in the direction in which the recording head will scan the tape during its use in recording than in other directions. The particles are oriented by applying a magnetic field in the scanning direction to the wet coating as it passes between the coater and the drier.

By one recording technique, the tape is run across a stationary recording head so that the coating is scanned in the lengthwise or longitudinal direction; that is, in the direction along the length of the tape. This technique is used, for example, for recording audio signals. A magnetic tape which is optimized for use with this recording technique comprises a coating having elongated magnetic articles that are oriented to impart a greater residual induction in the lengthwise or longitudinal direction of the tape than in the widthwise direction; that is, the direction along the width of the tape. Such lengthwise orientation may be achieved, for example, with the apparatus described in U.S. Pat. No. 3,162,792 to R. A. Hackley, et al.

By another recording technique, the tape is run across a rapidly rotating recording head so that the coating is scanned in the widthwise or transverse direction; that is, in a direction which is almost normal to the lengthwise or longitudinal direction of the tape. This technique is used, for example, for recording video signals. A magnetic tape which is optimized for use with this technique comprises a coating having elongated particles that are oriented to impart a greater residual induction in widthwise direction than in the lengthwise direction: Such widthwise orientation may be achieved for example, with the apparatus described in U.S. Pat. No. 3,021,230 to J. Doriaud.

In some recording equipment, both of the foregoing recording techniques are used. In such equipment different longitudinally-extending regions of the tape coating (sometimes called "tracks") are scanned at the same time in both the longitudinal and transverse directions by different recording heads. For example, in one equipment for television recording, the video (picture) signals are recorded transversely across the central portion of the tape coating, and the audio, synchronizing, and cue signals are recorded longitudinally in tracks along the edges of the tape. Heretofore, magnetic tape for use with this combined technique comprises a uniform coating in which the particles are entirely unoriented or are oriented entirely in only one scanning direction. In both of these cases, the performance of the tape in one or both directions of scanning is not optimized.

An object of this invention is to provide a magnetic recording tape comprising magnetic particles that are oriented so that different longitudinally-extending regions can be scanned in different directions at the same time with optimized performance.

Another object is to provide a novel apparatus for carrying out the novel method.

In general, the recording tape comprises a base or backing and a magnetic layer thereon comprising magnetic particles in a binder. The layer has at least two longitudinally-extending regions. One of the regions exhibits a higher residual induction in the widthwise direction than in the lengthwise direction of the tape, and the other region exhibits a higher residual induction in the lengthwise direction than in the widthwise direction of the tape. In a typical tape, the particles of one region are oriented widthwise and the particles of the other region are oriented lengthwise.

The recording tape, by virtue of the above-mentioned residual inductions in the respective longitudinally-extending regions, is thereby optimized to record signals in the longitudinal direction in the one region of the tape, and to record other signals in the transverse direction in the other region of the tape.

The magnetic tape may be prepared by a method which comprises, first, coating the surface of a tape web with a liquid composition including magnetic particles and a binder therefor. Then, the tape web is moved in the direction of its length through a magnetic field which includes one field portion whose direction is substantially parallel to the length of the tape and another field portion whose direction is substantially parallel to the width of the tape. There may be more than one field portion of each type. The field portions are preferably arranged so that the transversely directed field portions and the longitudinally directed field portions are applied alternately to laterally displaced regions across the wet coating. As the web passes through the field, a substantial proportion of the particles in each region of the tape is oriented in the direction of the field portion to which that region is subjected, thereby providing longitudinally-extending regions in the layer whose particles are oriented either lengthwise or widthwise. The width of the oriented regions may be adjusted by adjusting the width of the field portions.

After the magnetic particles are oriented by the applied field portions, the coating is solidified. Then, the tape web is slit lengthwise into tapes of the desired widths as required by the recording apparatus. Obviously, the required widths of the oriented regions are determined by the required recording widths for each particular apparatus in which the tape is to be used. Thus, one common type of television recorder uses a 2" inch wide tape which is scanned longitudinally over about 0.125 inch of width along each edge of the tape and is scanned transversely over about 1.5 inch of tape over the central portion of the tape.

The method may be practiced with a novel apparatus especially designed for orienting magnetic particles in magnetic recording tape. The apparatus comprises a core of high magnetic permeability having a longitudinal axis therethrough. The core is comprised of two confronting spaced apart portions on opposite sides of the axis, each of the portions being comprised of two adjacent pieces. The pieces of each portion are serrated along their adjacent sides and are spaced apart to provide a gap therebetween which extends generally in a direction transverse to the axis. Each gap describes a zigzag course of at least two legs, each leg of the course being disposed at an angle of less than 25° with the longitudinal axis of the core. The two gaps in the two confronting portions are opposite one another. Preferably, each piece has a longitudinally-extending slot at the base of each serration. There is also provided means for producing a unidirectional magnetic field in each of the core portions. The preferred field-producing means includes a single coil of wire around the core and adjustable means for energizing the coil. Other means for inducing a magnetic field in the core portions may be used.

When a magnetic field is produced in the core portions, opposed fringing fields appear across the zigzag gaps in the core. The direction of the fringing field along the gaps is substantially normal to the longitudinal axis over the major portion of each serration, and is substantially parallel to the longitudinal axis at the base and crown of each serration. When the tape web with the wet coating thereon is moved through the core between the core portions, the transversely directed fringing field portion orients particles widthwise along one longitudinally-extending region, and the longitudinally directed fringing field portion orients particles lengthwise along another longitudinally-extending region of the coating.

A further description of the invention together with illustrative embodiments of various features thereof is set forth below with reference to the drawings in which:

FIG. 1 is a partially sectional, partially schematic side view of an apparatus for coating and orienting magnetic particles of the new tape.

Figure 2:
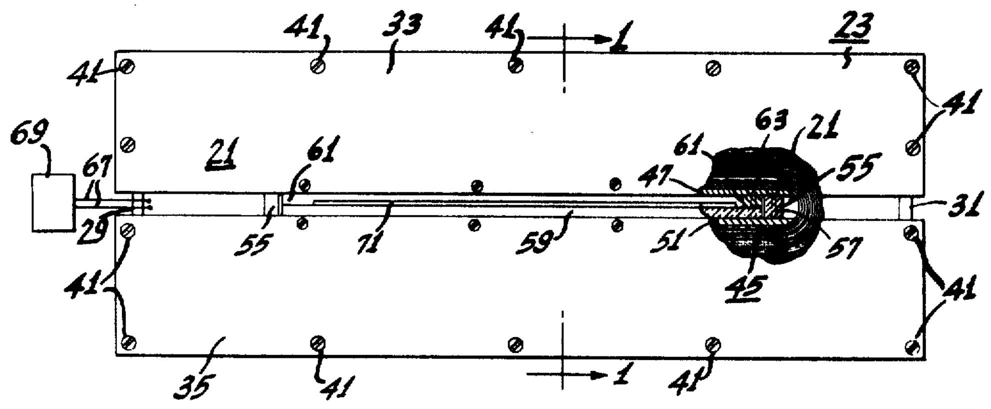
Figure 6:
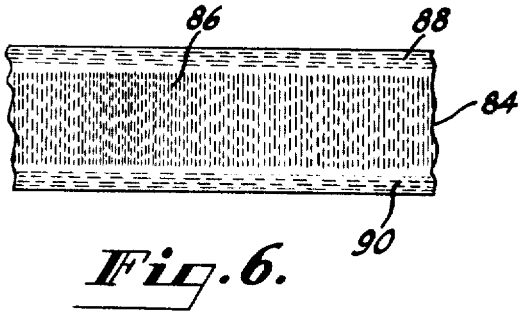
Figure 3:
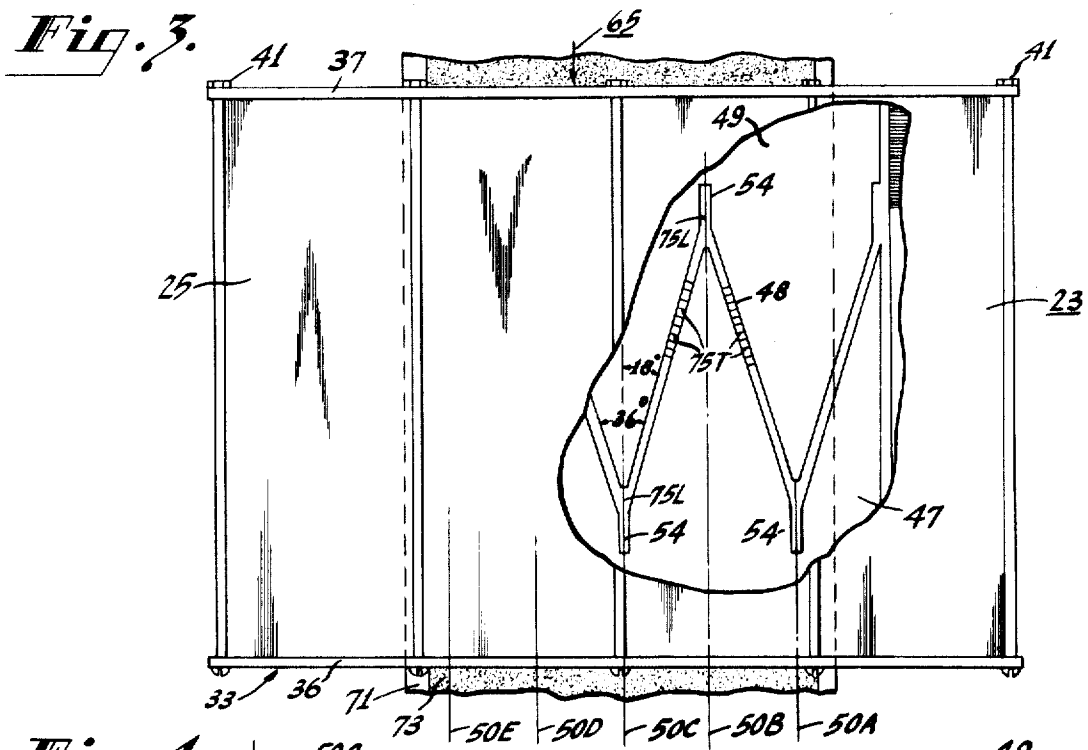
Figure 4:
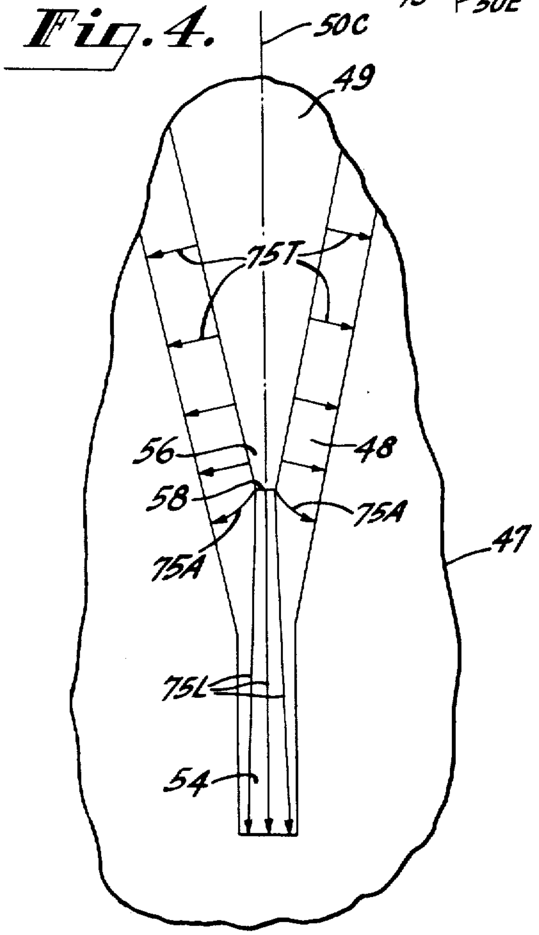
Figure 5:
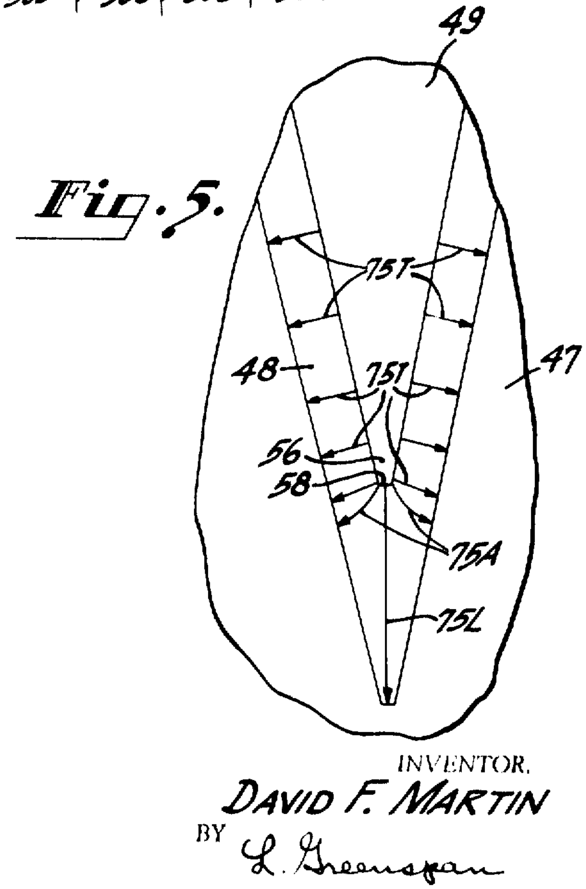

FIG. 2 is a partially broken away, partially schematic front view of the orienting solenoid shown in FIG. 1, FIG. 3 is a partially broken away, top view of the orienting solenoid shown in FIG. 1, FIG. 4 is a fragmentary top view of a portion of the gap in the core of the embodiment of FIG. 1, FIG. 5 is a fragmentary top view of a portion of the gap in the core of another embodiment of the apparatus of the invention, and FIG. 6 is a top view of an embodiment of the new tape.

FIGS. 1, 2 and 3 include views of the same embodiment of an orienting solenoid of the invention. The apparatus comprises a coil 21 of wire within a high magnetic permeability shell. The coil 21 has an opening therethrough. A longitudinal axis 50c (FIG. 3) extends through the opening in the coil 21, which axis is preferably, but need not necessarily be, coincident with the axis of symmetry of the coil. The longitudinal axis is, however, the axis of symmetry of the core portions described below.

In one embodiment, the coil 21 is about 5.25 inches high, 20.25 inches wide and 8.13 inches thick. The opening through the coil 21 extends through the thickness of the coil 21 and is about 1.5 inches high and 16.0 inches wide. The opening through the coil 21 is centrally located with respect to the height and width of the coil, but the location of the opening in the coil is not critical. Further, the coil 21 may occupy a volume less than the entire space within the shell 23.

In the one embodiment, the coil 21 is made up of 4000 turns of No. 16HF copper wire. The opening through the coil 21 has a height substantially less than its width, being made large enough to receive a core assembly 45 which is described below. Alternatively, the coil may be made of wire of other shapes, sizes, and materials. For example, the wire may have a square, hexagonal or round cross section, and may be made of silver or aluminum.

The shell 23 of high permeability material surrounds the coil 21 thereby providing low reluctance magnetic flux paths around the coil. In the one embodiment, the shell 23 is of 0.50 inch thick cold rolled steel plate and preferably covers substantially the entire surface of the coil 21. The shell 23 may be made of any high magnetic permeability material, such as steel or various alloys of steel. The shell 23 may be comprised of any combination of plates or sheets of any suitable thickness which provide a continuity of magnetic flux path over the surface of the coil 21. As shown in FIGS. 1, 2 and 3, the shell 23 comprises a top panel 25, a bottom panel 27, a left end panel 29, a right end panel 31, a top front panel 33, a bottom front panel 35, a top back panel 37, a bottom back panel 39, and a core assembly 45. The various panels are held together with holding screws 41 placed at suitable positions around the shell 23.

The core assembly 45 includes a top core portion comprising a top front piece 47 and a top back piece 49, a bottom core portion comprising a bottom front piece 51 and a bottom back piece 53; together with means 55 and 57 for maintaining the core portions in the desired confronting spaced apart relation and a means 59 and 61 defining a path for magnetic tape between the core portions. The core assembly 45 is an important feature of the apparatus and is designed to be easily removable and insertable to add flexibility in using the apparatus. The top front piece 47 and the top back piece 49 are arranged in a single plane over the top face of the opening in the coil 21. The bottom front piece 51 and the bottom back piece 53 are arranged in a single plane and positioned over the bottom face of the opening in the coil 21. The plane of the two top pieces 47 and 49 and the plane of the two bottom pieces 51 and 53 are spaced apart a prescribed distance with spacers 55 held with spacer screws 57, which spacing defines the height of the slot therebetween. The size and spacing of the pieces 47, 49, 51 and 53 are such as to fit snugly in the opening of the coil 21. The overall dimensions of the one embodiment are about 6.5 inches high, about 21.5 inches wide, and about 9.5 inches thick. The slot defined by the core portions extends through the thickness of the apparatus and is about 0.25 inch high and 15.00 inches wide. The slot through the shell 23 is centrally located with respect to the height and width of the apparatus.

The core portions through the coil opening to define a narrow slot therethrough, and are disposed on opposite sides of the axis 50c in said coil in confronting, spaced apart relation. The top front piece 47 and top back piece 49 of the top core portion are spaced from each other a short distance, which distance is referred to hereinafter as the upper gap 48. The length of the upper gap 48 is such as to provide a fringing magnetic field 75, which extends out from the gap 48 when the coil 21 is energized. As shown in FIG. 1, the edges of the top pieces 47 and 49 which face one another are square. The upper pieces 47 and 49 and the gap therebetween is shown in the broken away part of FIG. 3. The cross section (as viewed in FIG. 3) of the upper gap may be varied to suit the particular purposes for which the apparatus is to be used. Thus, rounded corners, beveled corners, or square corners are considered equivalents of the square edges illustrated in FIG. 1. The gap length (distance between pieces) also may vary. Generally, the longer the gap length, the greater will be distance that the field fringes out from the gap, and the lower will be the flux density. It is preferred to provide the shortest gap length which is consistent with the efficient processing of tape through the core. In the one embodiment, the gap between the top pieces 47 and 49 is 0.25 inch long at their closest approach and is substantially uniform over its course.

An important feature of the apparatus is the course of the gap 48 as shown particularly in the broken away portion of FIG. 3. The adjacent edges of the upper core pieces 47 and 49 have intermeshed serrations (teeth), and are spaced to provide a gap which described a generally zigzag pattern or course of at least two legs. There are six legs in the course of the embodiment shown in FIG. 3. Each leg of the course is disposed at an angle of less than 25° with the axis 50C, but preferably about 15°. Smaller angles may be used. By shaping the upper gap 48 in this manner, a transverse fringing field portion 75T is produced which is substantially normal to the longitudinal axis 50C over most of each leg of the course; and a longitudinal fringing field portion 75L is produced which is substantially parallel to the longitudinal axis 50C at the ends of each leg, as indicated in more detail in FIGS. 4 and 5. FIG. 3 includes center lines 50A, 50B, 50C, 50D and 50E which indicate the center of the longitudinal fringing field portion.

Both of the upper core pieces 47 and 49 may be exactly matched in shape, as shown in FIG. 5, to provide a gap of completely uniform width. However, it has been found to be desirable, as shown in FIGS. 3 and 4, that each piece 47 and 49 have a longitudinally extending slot 54 at the base of each serration (tooth). The reason for the use of slots is that the longitudinal field portions 75L are more definitely defined over a somewhat broader region of the tape than in an embodiment without a slot, such as the one shown in FIG. 5. While there may be some reduction in longitudinal field strength due to the lengthened gap at each slot, this appears to be adequately compensated for by the increased time that the coating is exposed to the longitudinal field portion as it passes through the core.

FIGS. 4 and 5 also show an angular field portion 75A which is transitional between adjacent longitudinal and transverse fringing field portions 75L and 75T. The flux path of the angular field portion 75A is believed to be curved approximately as shown. The angular field portion produces a region in the tape of finite width (about 0.125 inch in the specific example) in which the remanence varies from higher in the longitudinal direction to higher in the transverse direction. This is an acceptable separation of the longitudinally oriented and transversely oriented regions of the tape. The width of the angular field portion may be changed by changing the geometry of the gap.

FIG. 5 also shows that the piece 49 almost comes to a point at the top 56 of the tooth between the two legs of the zigzag course of the gap. As shown, there is a small flat 58 at the top 56 of the tooth which produces a very narrow longitudinal field portion 75L. The longitudinal field portion may be broadened by broadening the flat 58 as shown in FIG. 4. This is particularly effective when the elongated slot 54 is provided. The width of the flat 58 and the width of the slot 54 may be designed to provide a longitudinal field portion which has a desired width and optimum definition.

The width of the transverse field portion may be changed by changing the transverse dimension between adjacent longitudinal field portions 75L. This may be done by lengthening the legs or by changing the angle between the legs and the axis 50C.

The novel apparatus has the attribute that cores with different zigzag courses and/or different gap geometries may be quickly and easily substituted in the coil. This permits the tape factory to change over to different products with better efficiency.

The bottom front and back core pieces 51 and 53 of the bottom core portion are also spaced from each other a short distance, which distance is referred to hereinafter as the lower gap 52. As shown in FIG. 1, the lower gap is identical in configuration with the upper gap except that it is a mirror image thereof around the longitudinal axis 50C. Both the upper and lower gaps 48 and 52 are opposed and extend across the entire face of the slot in a direction generally normal to the longitudinal axis in the coil 21. The two top pieces 47 and 49 and the two bottom pieces 51 and 53 are also made of a high magnetic permeability material of suitable thickness, such as 0.50" thick cold rolled steel plate. All of the panels and pieces of the shell and core assembly are fitted to close tolerances in order to reduce or eliminate any undesired gaps in the low reluctance magnetic flux path except at the desired upper and lower gap.

A support 59 defining a path for a magnetic tape web 71 passing through the slot in the coil 21 is positioned on top of the bottom front and back pieces 51 and 53. The support 59 is held in position with a support spacer 61 and screws for the support 63 as part of the core assembly 45. The support 59 is made of a nonmagnetic material, such as a solid plastic sheet, and has a thickness such that, when the back of the web 71 rests thereon, the center of the thickness of the magnetic coating to be oriented is on the plane of the magnetic field parallel to the longitudinal axis in the coil 21. Two leads 67 come out of the coil 21 and attach to an adjustable DC voltage source 69, which is shown schematically in FIG. 2.

In operating the apparatus, the voltage source 69 is adjusted to provide the desired current flow through the leads 67 and the coil 21. In the one embodiment, the coil 21 may carry between about 0.1 and 2.0 amperes, preferably about 0.40 amperes. The current flow in the coil generates a magnetic field in a particular direction, its direction being opposite for opposite directions of current flow in the coil 21. The flux of the magnetic field produced thereby is concentrated in the high magnetic permeability shell 23, except where the flux must jump the upper and the lower gaps 48 and 52. At the gaps, the flux 75 of the magnetic field across each gap fringes out toward the longitudinal axis through the coil 21. The fringing magnetic fields oppose one another. The vector sum of portions of the two fringing fields produces a plane field in the coil near the center of the space between the top pieces 47 and 49 and the bottom pieces 51 and 53. The web 71 having a wet coating 73 to be oriented is passed through the slot in the direction shown by the arrow 65 along the magnetic field. The particles in the wet coating 73 are oriented by the action of the magnetic flux thereon. The portion of the magnetic field used for orienting magnetic particles extends over only a short distance in lengthwise direction along the wet coating. Such a configuration of the magnetic field is especially desirable for orienting magnetic particles in a recording tape, because it helps to limit particle migration in the wet coating by reducing the application of the orienting field to a shorter defined period of time.

FIG. 1 illustrates also apparatus for carrying out the method which includes coating the web 71, orienting the particles in the coating and then drying the coating. As illustrated, a tape web 71 is unwound from a feed roll 72, conducted along a prescribed path for processing in the direction of the arrow 65, and then wound on a takeup roll 74. Several processing stations are located along the path. Upon being unwound from the feed roll 72, the web 71 passes over a table 76 and below a doctor blade 78. The lower edge of the doctor blade is positioned in a direction transverse to the direction of travel of the web 71. A liquid composition 80 comprising magnetic particles and a binder therefor is placed on the feed roll side of the blade 78. The lower edge of the doctor blade 78 is spaced a desired distance above the web 71 so as to coat the composition as a layer 73 of a desired thickness. The coated web 71 now passes through the solenoid. As the web 71 passes through the solenoid, the fringing fields 75 orient the particles in the direction as described above along longitudinally extending regions of the coating 73. The wet coating then moves to a dryer 82 where the coating is dried.

In a typical operation, a 1.0 mil thick by 12 inch wide web of a polyethylene terephthalate is fed at a lineal speed of about 40 feet per minute between the feed and takeup rolls 72 and 74. The doctor blade is adjusted to produce a liquid coating about 4 mils thick of a composition comprising by volume percent:

| | |
|---|---|
| magnetic particles (acicular ferric oxide) | 20 |
| vinyl chloride-acetate copolymer | 25 |
| plasticizer | 5 |
| solvent (e.g., methyl isobutyl ketone) | 50 |

The coil 21 is energized with about 0.4 amperes producing a field of about 1,400 oersteds in the transverse direction. As the web 71 passes through the coil 21, the coating 73 is oriented. The oriented coating 73 then passes to a dryer 82 where the coating 73 is solidified by removing the solvent and, to some extend, by curing the binder of the coating. The drying 82 is comprised of an elongated chamber about 10 feet long supplied by air at about 80° C. at the rate of about 50 cubic feet per minute. The web 71 is now wound on the takeup roll 74.

Then, the roll 74 of coated web material is placed on a slitting machine (not shown) where it is unwound and slit in a conventional manner. The web is slit along the center lines 50A, 50B, 50C, 50D, and 50E (FIG. 3) so as to produce web segments or tape which includes a central transversely oriented region and two edge regions which are longitudinally oriented. In the typical operation described above, the web is 12 inches wide with the center lines spaced two inches apart. Five tapes, a segment 84 of which is shown in FIG. 6, can be cut from the web, each having a central transversely oriented region 86 about 1.74 inches wide and two longitudinally oriented edge regions 88 and 90 about 0.13 inch wide.

In order to compare the new magnetic tapes with prior tapes, the orientations of each type of region in each of the longitudinal and transverse directions are compared with those of other tapes. The orientation is the value of $Br/4\pi I$, where $Br$ is the remanent magnetization of the coating resulting from an applied field of 1000 oersteds and I is the magnetic intensity of the coating at 1000 oersteds. In the Table, the orientations of the longitudinally oriented edge region and transversely oriented central region in the transverse and longitudinal directions of a tape prepared by the typical process described above are compared with a completely unoriented tape, and with a commercial television recording tape which is oriented only in the transverse direction. The new tape exhibits a substantial improvement in the longitudinal orientation in the edge regions over both of the other tapes and exhibits a substantial improvement in the transverse orientation in the center region over the unoriented tape. As a result of these particular improvements in orientation, the edge region exhibits about a 3 db. improvement in the signal/noise ratio in its output signal for a longitudinally recorded signal, and the center region exhibits a slight improvement in the signal/noise ratio in its output signal for a transversely recorded signal.

The new tape may exhibit different orientations in the edge regions than in the center regions. Thus, unlike previous tapes, no compromise need be made in the recording characteristics in either of the two types of regions.

The base or backing for coating may be any of the usual materials used in the magnetic recording tape art. Paper, cellulose acetate, polyester, and metal foils may be used in various thicknesses and widths. The magnetic particles may be any of the particle-types used in magnetic recording elements; for example, gamma iron oxide, zinc ferrous ferrite, chromium dioxide, magnetite, and metal particles. The binder is selected to be compatible with the magnetic particles and the base and may be a binder usually used. Further, the proportions of ingredients and the preparation of the coating composition may be the formation and processing that is usually used in preparing magnetic coatings.

The orienting core may be of any transverse dimension and is preferably wider than the tape width. The transverse dimension of the transverse field portions may be changed by changing the length of the legs constituting the gap. The longer the leg for a given angle, the wider the transverse field portion. In a single core, the legs may be of different lengths. The transverse dimension of the longitudinal field portion may be changed by changing the width of the slot at the juncture of the legs and by blunting the point of the field piece opposite the slot. The wider the slot and blunt portion, the wider the longitudinal field portion. In a single core, the slots may be of different widths. The field pieces may be made to be adjustable as to leg length, slot width, etc. However, the field pieces described with respect to FIG. 1 are unitary and are therefore not adjustable. In such case, changes in the dimensions of the field portions are achieved by substituting a different core having the desired characteristics. This is easily done in the solenoid structure illustrated in FIGS. 1 and 3, requiring only that one core be slipped out and another core slipped into place.

The slitting is carried out generally in the manner usually used for slitting magnetic tape. The web may be slit into tape of uniform widths or of different widths and may have different arrangements of longitudinally extending regions. Each tape, however, has at least two horizontally extending regions, one transversely oriented and the other longitudinally oriented. One problem which arises is that of proper tracking of the regions by the slitting knives. It is often difficult to follow the centerlines of the oriented regions so that the slit may be made in a desired position with respect to these centerlines. One method of solving this problem is to maintain one edge in a fixed position as the web passes through the orienting core. Then all slitting is conducted with respect to this edge. By another method, the dry coating is sensed to locate a boundary between regions of different orientation, and the locating of the slit with respect to this boundary. By still another method, a longitudinal stripe is applied to the web as it passes through the orienting core. The stripe has a fixed position with respect to one centerline. Then the stripe is sensed optically, and the slitting knives are located with respect to the stripe.

TABLE

| Television recording tape | Region | Orientation: Longitudinal direction | Orientation: Transverse direction |
|---|---|---|---|
| New tape | Edge | 0.76 | 0.60 |
| | Center | 0.48 | 0.76 |
| Unoriented tape | Edge | 0.65 | 0.57 |
| | Center | 0.65 | 0.57 |
| Commercial television | Edge | 0.56 | 0.72 |
| Recording tape | Center | 0.56 | 0.72 |

I claim:

1. Electrical apparatus for orienting magnetic particles in magnetic recording tape during the manufacture thereof comprising:
   a core having a longitudinal axis therethrough, said core being comprised of two spaced apart confronting portions on each side of said axis, each of said portions being comprised of two pieces and spaced to provide a gap of a predetermined distance, said gaps describing zigzag courses in the transverse direction, said gaps being opposed to one another,
   and means for inducing a magnetic flux in each of said portions.

2. Electrical apparatus for orienting magnetic particles in magnetic recording tape during the manufacture thereof comprising:
   a core having a longitudinal axis therethrough, said core being comprised of two spaced apart confronting portions on each side of said axis, each of said portions being comprised of two intermeshed serrated pieces which are spaced to provide a gap of a predetermined distance, said gap describing a zigzag course in the transverse direction, said gaps being opposed to one another, each piece having a longitudinally extending slot at the base of each serration,
   and means for inducing a magnetic flux in each of said portions.

3. Electrical apparatus for orienting magnetic particles in magnetic recording tape during the manufacture thereof comprising:
   a coil of wire having a longitudinal axis therethrough,
   a core of said coil, said core being comprised of two confronting spaced apart portions on each side of said axis, each of said portions being comprised of two intermeshed serrated pieces which are spaced to provide a gap of a predetermined distance, said gap describing a zigzag course in a direction transverse to said axis, each leg of said course being disposed at an angle of less than 25° with said longitudinal axis, said gaps being opposed to one another,
   and a closed magnetic flux path connected to each of said portions.

4. Electrical apparatus for orienting magnetic particles in magnetic recording tape during the manufacture thereof comprising:
   a coil of wire having a longitudinal axis therethrough,
   a core in said coil, said core being comprised of two confronting spaced-apart portions of each side of said axis, each of said portions being comprised of two intermeshed toothed pieces which are spaced to provide a gap describing a zigzag course, each leg of said course being disposed at an angle of less than 25° with said longitudinal axis, said gaps being opposed to one another, each piece having a longitudinal slot at the base of each tooth,
   and a closed magnetic flux path connected to each of said portions.